United States Patent
Trui et al.

[11] 3,833,269
[45] Sept. 3, 1974

[54] FLUID OPERATED SAFETY BRAKE SYSTEM

[75] Inventors: Josef Trui, Bissingen; Klaus-Otto Riesenberg, Ludwingsburg; Inge Schwerin, Moglingen, all of Germany

[73] Assignee: Robert Bosch GmbH, Stuttgart, Germany

[22] Filed: Dec. 21, 1972

[21] Appl. No.: 317,359

[30] Foreign Application Priority Data
Dec. 23, 1971 Germany............................ 2164094
Aug. 31, 1972 Germany............................ 2242745

[52] U.S. Cl............................. 303/21 F, 188/181 A
[51] Int. Cl.............................................. B60t 8/02
[58] Field of Search........................ 303/21, 61–63, 303/68–69; 188/181

[56] References Cited
UNITED STATES PATENTS
3,449,019   6/1969   Walker............................. 303/21 F
3,682,514   8/1972   Oberthür.......................... 303/61 X
3,702,713  11/1972   Oberthür.......................... 303/21 F

*Primary Examiner*—Duane A. Reger
*Assistant Examiner*—D. C. Butler
*Attorney, Agent, or Firm*—Michael S. Striker

[57] ABSTRACT

A fluid operated brake system is controlled by two main valves operated by two electromagnetic valves, which are controlled by an electronic control device responding to signals of a sensor which senses a locked condition of the brake, requiring relieving of the pressure of the brake actuating means through a discharge conduit opened by one of the main valves. If the discharge conduit is opened due to a malfunction when braking is required, the wheel is not braked at all. A safety control valve is provided which is operated by pressure fluid under the control of one of the electromagnetic valves, to close the discharge conduit when not closed by the respective main valve due to malfunction of the respective electromagnetic valve, so that a braking force is assured.

9 Claims, 4 Drawing Figures

FLUID OPERATED SAFETY BRAKE SYSTEM

BACKGROUND OF THE INVENTION

The present invention relates to a safety arrangement for a fluid operated brake system which is controlled by electronic means having sensors for sensing the braking and locked position of the brake of a motor car. The brake system includes two fluid operated main valves, and two corresponding electromagnetic valves which control the flow of operating fluid to the main valves. In a brake system of this type, there is the problem that in the event of failure of one of the electromagnetic valves, or due to sticking of a main valve, the connection between the brake valve and the brake actuating cylinder cannot be obtained, or that the connection between the cylinder of the brake actuating means and a discharge conduit is not closed, so that the brake pressure cannot rise in the brake cylinder of the brake actuating means, which would result in complete failure of the respective brake.

SUMMARY OF THE INVENTION

It is one object of the invention to assure a reliable operation of a brake system of this type, even if one of the valves fails.

Another object of the invention is to provide a fluid operated safety brake system which remains ready for a braking operation even if after the reduction of the brake pressure for preventing locking of the brake, the brake pressure rises again, and if a non-functioning or jammed valve interrupts the communication between the brake operating valve and the brake actuating cylinder, or if the connection between the brake cylinder and the discharge conduit remains open.

With these objects in view, an embodiment of the invention provides at least one of the main valves with a safety control valve with a piston and a closure member which opens and closes a stationary valve seat. The control piston is subjected to pressure at at least one piston face, and is biased by a spring which holds the safety control valve in an inoperative normal position, but whose spring force is overcome by pressure acting on the control piston to close a discharge conduit when at least one of the valves fails.

It is advantageous to provide a throttle valve for the cylinder of the control valve, which operates in such a manner that during filling of the cylinder, the throttle valve is effective, and that during emptying of the cylinder the throttle valve is ineffective so that unnecessarily fast operation of the safety control valve is prevented.

It is also advantageous to provide limit switches operated by the safety control valve and by at least one of the main valves, by which the operation of the safety valve can be electrically monitored. In this manner, it is possible to check before a drive, or at predetermined time intervals during inspections of the apparatus, the function of the apparatus.

It is also advantageous to provide a double seat valve mechanically operated by the piston of the main valve, and provided in a connecting conduit opening into the cylinder of the safety control valve so that the latter performs its function when the main valve fails. In this manner, a reliable brake effect can be obtained not only upon failure of an electromagnetic control valve controlling a main valve, but also upon jamming of a main valve.

Generally speaking, a safety brake system according to the invention comprises brake actuating means, which may include a brake cylinder whose pistons are connected with a brake, and operating means, such as a foot pedal operating a piston in a cylinder connected with the brake cylinder through two pressure operated main valves. One of the main valves has a discharge conduit, and the main valves have a first position connecting the brake operating means with the brake actuating means while the main valve closes the discharge conduit, and a second position opening the discharge conduit for relieving the brake actuating means, while disconnecting the brake operating means and brake actuating means. Two electromagnetic valves are provided for controlling the flow of pressure fluid to the main valve for moving the main valves between the first and second positions. At least one safety control valve is biased to a normal position opening the discharge conduit for relieving the brake actuating means through the main valves and the discharge conduit when one main valve is placed in the second position by one of the electromagnetic valves.

At least the electromagnetic valve which controls the supply of pressure fluid to the control valve means, closes the control valve means and thereby the discharge conduit when one of the main valves fails to close the discharge conduit, which may be due to a malfunction of the respective electromagnetic valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
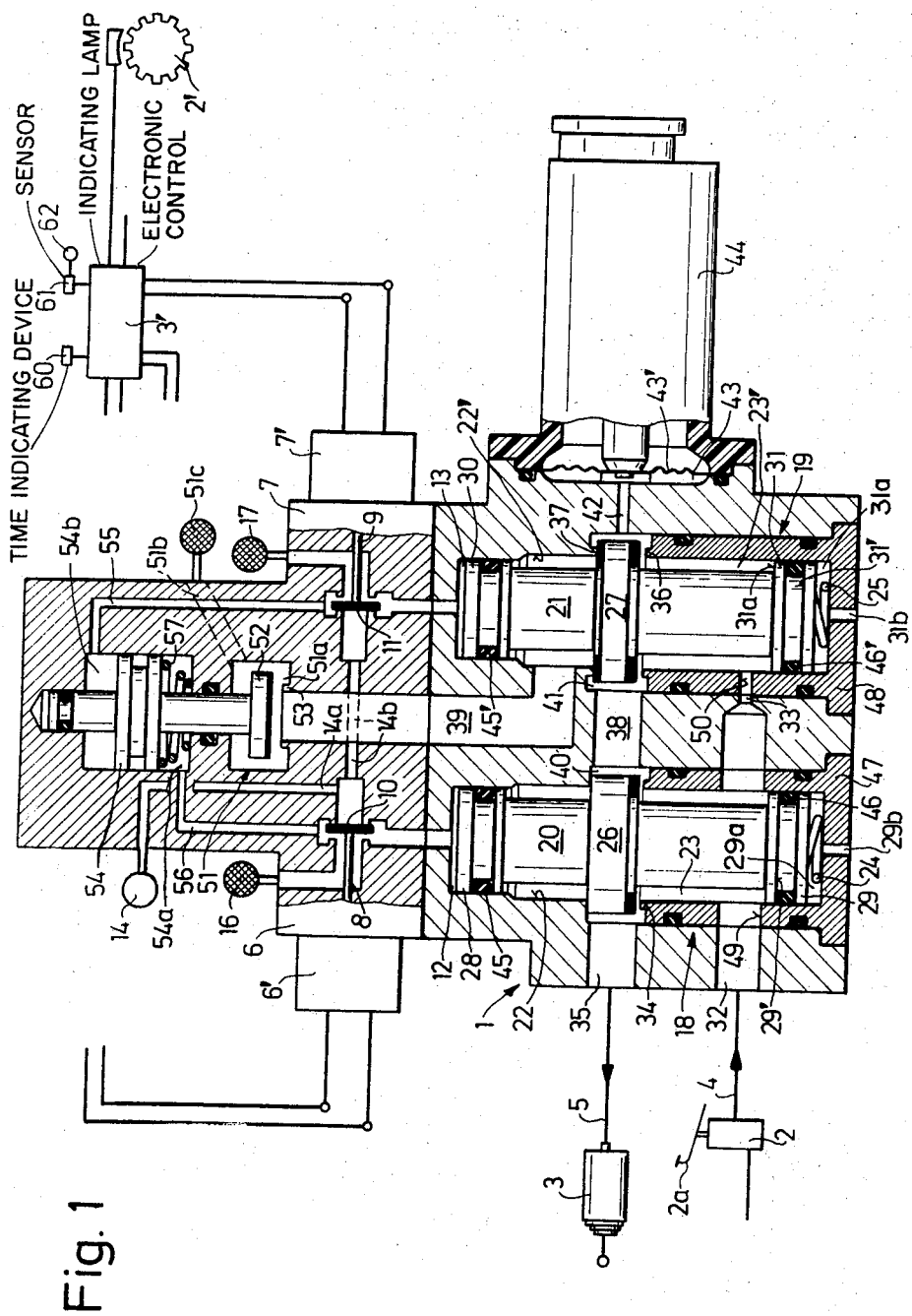
FIG. 1 is partly a schematic sectional view, and partly a diagrammatic view illustrating conduits for a fluid and electric connections, and illustrating a first embodiment of the invention.

Referring first to FIG. 1, the apparatus includes a main valve unit 1 which is connected into a conduit 4, 5 which connects a brake operating valve 2 with a foot pedal 2a, with a brake cylinder 3 by which the brake of a wheel is actuated. An electronic control means 3' is provided and receives signals from a sensor 2' which senses the condition of the wheel on which the brake actuating means 3 act. The electronic control means 3' is connected with electromagnets 6' and 7' of electromagnetic valves 6 and 7 which control the flow of pressure fluid to the cylinder chambers 12 and 13 formed by main pistons 20 and 21 of main valves 18 and 19. The electromagnetic valves 6 and 7 have armatures 8 and 9 secured to valve members 10 and 11 which control the flow of fluid, such as air, between the cylinder chambers 12 and 13 and either a source of compressed air 14, or discharge means 16 and 17. In the illustrated position, the source of compressed air 14 is connected to a conduit 14a with a conduit 14b, closed by the valve member 10, while the cylinder chamber 12 is connected with a cylinder chamber 54a of a safety control valve 51 whose other cylinder chamber 54b on the other side of a control piston 54, is connected by conduit 55 with the cylinder chamber 13 of the main valve 19. When the valve members 10 and 11 are shifted by the electromagnets 6' and 7', the connections between cylinder chambers 12 and 13 and the discharge means 16 and 17 is interrupted.

The main valves 18 and 19 have movable main pistons 20 and 21 located in a cylinder bore 22, 23 and being biased by springs 24, 25. Each main valve piston 20, 21 has a main valve member 26, 27, and piston portions 28, 29 and 30, 31 at the ends. Piston portions 28 and 30 bound the cylinder chambers 12 and 13, while the pistons portions 29 and 31 form cylinder chambers 29a and 31a which communicate with the atmosphere through openings 29b and 31b. The inner annular faces 29', 31' are subjected to the pressure of the brake conduit 4 which opens into a conduit 32 which communicates with an annular space 23 surrounding main piston 20, and through another conduit 33a with a throttle 33 through a bore 50 with an annular space 23' surrounding the main piston 21.

The main valve 18 has only one valve seat 34 which can be opened and closed for connecting and disconnecting the brake conduits 4 and 5 through conduits 35 and 32 and the annular space 23. The second main valve 19 has two valve seats 36 and 37 located on opposite sides of the valve portion 27 of main piston 21. Together with the valve portion 27, the valve seat 36 controls the connection between the channels 35, 38 with the annular space 23', while valve seat 37 controls a connection of channel 38 with a main discharge conduit 39.

Valve seat 34, and valve seats 36, 37 are respectively located in annular chambers 40 and 41 in which the valve portions 26 and 27 are movable. The annular chambers 40 and 41 are connected with each other by the connecting conduit 38. The annular chamber 41 of the second main valve 19 is connected by a throttle bore 42 with the working chamber 43 of a pressure responsive inductive sensor 44 which is secured to the housing of the valve unit 1, and has a feeler element in the form of a membrane 43'.

The main valves 18 and 19 are pressure relieved due to a combination of sealing means 45 and 46 and 45' and 46', respectively, with bushings 47 and 48 provided with openings 49 and 50 for the pressure fluid. The two main valves 18 and 19 are connected in series so that the throttle passage 33 is upstream of the second main valve 19.

The safety control valve 51 is provided between the valve members 10 and 11 of the electromagnetic valves 6 and 7, as explained above. The safety control valve 51 includes a closure member 52, operated by piston 54 which is biased by spring 57, and cooperating with a valve seat 53 surrounding the discharge conduit 39 of main valve 19. The control piston 54 is secured to the closure member 52, and has two annular faces of the same area. The upper cylinder chamber 54b is connected by conduit 55 with the electromagnetic valve 11, while the lower cylinder chamber 54a is connected by conduit 56 with an electromagnetic valve 6. Spring 57 maintains the closure member 52 in a normal open position, as illustrated, in which the discharge conduit 39 is connected by a conduit 51b to a discharge outlet 51c.

The electronic means 3' has a schematically indicated time measuring device 60, a sensor 61 with an indicating lamp 62, and connections with the electromagnets 6' and 7'.

The apparatus illustrated in FIG. 1 operates as follows:

During operation of the motor car provided with the safety brake system of the invention, all parts of the valve unit 1 are in the position illustrated in FIG. 1. When the brake valve 2 is operated by pressure on the foot pedal 2a, pressure fluid, such as air, flows from the brake conduit 4 through annular space 23, annular space 40, valves 26/34, and conduit 35 into brake conduit 5 to the brake actuating cylinder 3 so that the brake, not shown, is operated and the car is braked.

If the brake force is so high that the braked wheel, not shown, is locked, which may cause skidding, sensors 2' senses this condition, and the electronic means 3' effects the energization of electromagnets 6' and 7' so that the electromagnetic valves 6 and 7 are operated and the armatures 8 and 9 move the valve members 10 and 11 to their respective other position so that the brake pressure, which has just caused locking acts through annular space 40, conduit 38, annular space 41, and throttle 42 on the membrane 43' so that a pulse is generated which is supplied to the electronic control means 3' which stores a signal indicating the locking of the brake, and the pressure which caused locking of the brake.

Since the valve members 10 and 11 of the electromagnetic means 6' and 7' are shifted, the cylinder chambers 12 and 13 of the main valves 18 and 19 are subject to air pressure from the source of compressed air 14 through conduits 14a, 14b, and the piston portions 28 and 30 move downward with main pistons 20 and 21 so that the valves 26/34 and 27/36 close. Valve 26/34 interrupts the connection between brake conduits 4 and 5 so that no further pressure increase can take place in the brake actuating cylinder 3. At the same time, the brake conduit 5 is connected by channel 38, annular space 41, the open valve 27/37, discharge conduit 39, chamber 51a, and conduit 51b with the discharge means 51c so that the pressure in the brake actuating cylinder 3 drops so that the wheel is no longer locked, and is accelerated.

The sensor 2' senses the beginning rotation of the wheel, and operates the electronic control means 3' to operate the electromagnets 6' and 7' so that the electromagnetic valves 6 and 7 and the main valves 18 and 19 are returned to the normal position shown in FIG. 1, the main pistons 20 and 21 being displaced by the springs 24, 25.

The brake conduits 4 and 5 are now again connected through the main valve 18, and pressure develops in the brake cylinder 3 which, however, is lower than the pressure which had caused locking of the wheel. Due to the storing of the locking pressure in the electronic control means 3' by means of the sensor 44, the stored locking pressure can be compared with the actual pressure, and the latter controlled to be almost as high as the locking pressure, but not so high as to cause locking of the brake.

The electromagnet 6' of the electromagnetic valve 6 is again operated under the control of the electronic control means 3', and the valve 26/34 is again closed. A pressure rise can only take place through the valve 27/36, upstream of which, the throttle 33 is located. Consequently, the pressure rises slowly, but since the throttle pressure fluid has initially a very high pressure, the brake actuating cylinder exerts a comparatively great pressure on the wheel, the brake distance is shortening, and the hysteresis of the brake is overcome.

In the event that within a time controlled by the time measuring means 60 of the electronic control means 3', the locking pressure has not been obtained, the electromagnet 6' of the electromagnetic valve 6 is switched off. Faster pressure rise up to the locking pressure takes place. If the locking pressure is reached before the expiration of a predetermined time period, the electromagnetic valves 6 and 7 are operated, and the brake is again released.

If during the first disconnection of the electromagnetic valves 6 and 7, the armature 9 with the valve member 11 sticks and fails, the second main valve 19 remains open which means that the brake actuating cylinder 3 is connected with the atmosphere, so that no braking pressure can develop and the wheel is no longer braked, and the change from a locked wheel to a freely rotating wheel causes a dangerous condition.

This danger is avoided in accordance with the invention since in the event of failure of the electromagnet 7', pressure air from the force of compressed air 14 acts through conduits 14a, 14b, and 55 in the cylinder chamber 54b, while the other cylinder chamber 54a is disconnected by the valve member 10 from the pressure source 14. Consequently, the valve member 52 moves downward against the action of the spring 57, and closes the valve seat 53 and thereby the discharge conduit 39 so that no air can escape from the brake conduit 5, irrespective of the fact that the valve 27/37 has not closed due to failure of the electromagnetic valve 7. Consequently, pressure develops in the brake actuating cylinder 3, and at a certain predetermined pressure, electromagnet 6' is operated by the electronic control means 3' so that the pressure rise is throttled by throttle 33.

Since the electromagnetic valve 6 causes the flow of pressure fluid to the cylinder chamber 51a of the control valve 51, the pressure in chamber 54b is overcome, and safety control valve 51 opens since valve member 52 moves away from the seat 53. Since the open safety control valve 51 permits escaping of pressure fluid from discharge conduit 39, the pressure drops in the brake actuating cylinder 3, and the electromagnet 6' is again disconnected. The cylinder chamber 51a is relieved, and piston 54 moves downward. The shifting of piston 54 with valve member 52 takes place in a rapid sequence substantially at the pressure obtained after the first pressure drop. The rapid movements of the control valve 51 can be sensed by a sensor 61 controlling a warning lamp 52 in the electronic means 3'.

Figure 2:
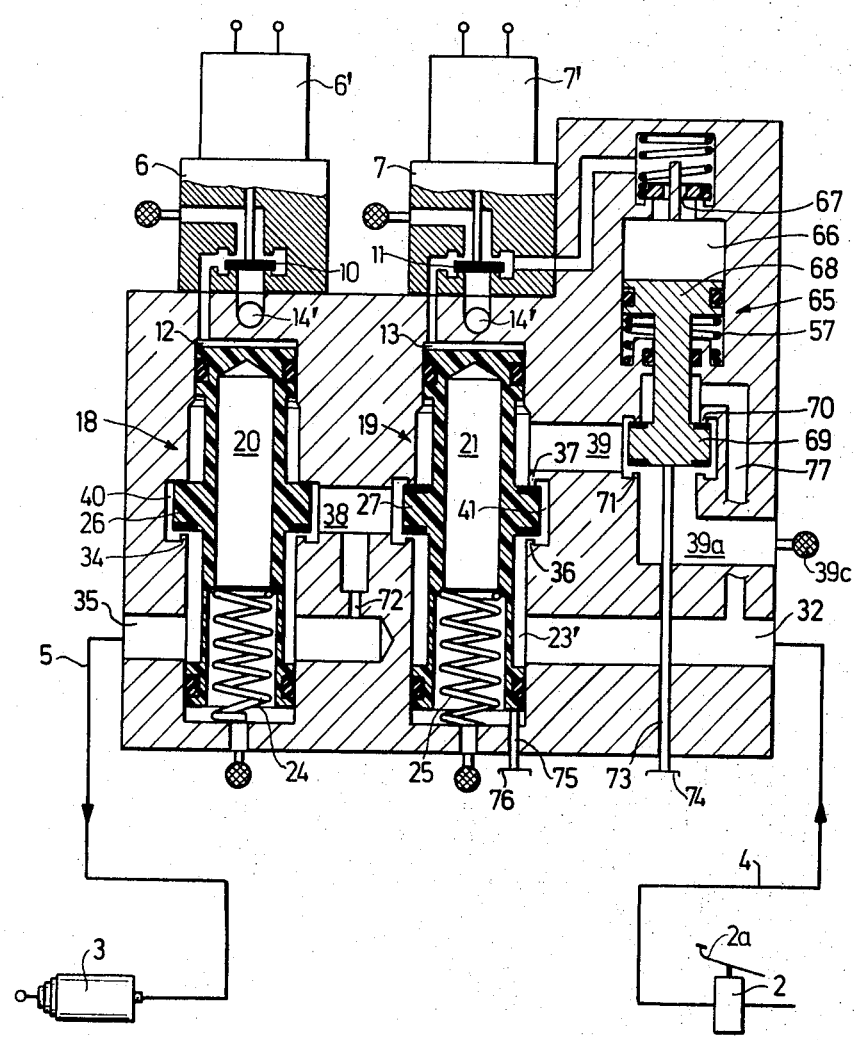
FIG. 2 is a schematic sectional view illustrating a second embodiment of the invention with a modified safety control valve.

FIG. 2 illustrates a safety brake system according to the invention in which the safety control valve 65 is modified as compared with the embodiment of FIG. 1.

The brake conduit 4 is connected with the inlet conduit 32 which leads to the annular space 23' of the main valve 19 which is arranged upstream of the main valve 18 with which it communicates through the channel 38, and also through a throttle 72 communicating with the conduit 35 which communicates with the brake actuating cylinder 3 through the brake conduit 5.

The safety control valve 65 has a cylinder chamber 66 which receives fluid from a source 14' of compressed air through the electromagnetic valve 7, 11 through a throttle check valve 67. A valve portion 69 is secured to the piston 68 and cooperates with an inlet seat 70 and an outlet seat 71. The operation of the apparatus shown in FIG. 2 corresponds to the operation of the apparatus of FIG. 1. During braking by pressure on the foot pedal 2a, pressure fluid flows from conduit 4 and 32 through the open main valve 19 and 18, and through conduits 35, 5 to the brake actuating cylinder 3. Some brake fluid also flows through the throttle 72 into the brake actuating cylinder 3.

When a wheel is almost locked, and the sensor 2' responds, first only the electromagnetic valve 7 is shifted by the electronic control means 3', shown in FIG. 1. Pressure air from the source 14' of compressed air enters the cylinder chamber 13, and the main piston 21 moves downward so that the valve portion 27 closes the seat 36 and thereby the brake conduits 4, 32. In this position, the brake cylinder 3 is connected by the open main valve 18 and connected over the open seat 37 of the main valve 19 with the atmosphere through discharge conduits 39, 39a and discharge means 39c. Brake cylinder 3 is thus relieved of pressure. After a certain rapid pressure drop, electronic control means 3' causes the closing of the circuit of the electromagnetic valve 6, so that the main valve 18 is shifted, and the pressure reduction in brake cylinder 3 takes place less rapidly through the throttle 72. During the shifting of the electromagnetic valve 7, the cylinder chamber 66 of the safety control valve 65 receives pressure fluid through the throttle check valve 67, but this pressure has no effect if the electromagnetic valve 7 returns at a predetermined speed to its initial position so that the downstream main valve 19 effects communication with the brake's conduits. This is due to the fact that the pressure fluid upstream of the control piston 68 will be rapidly discharged through the large flow cross section of the throttle check valve 37 during the following shifting.

If due to sticking or jamming of the armature of the electromagnetic valve 7, the main valve 19 has not been shifted back after about 1 second, the pressure rise in the cylinder space 66 and acting on the control piston 68 that the force of spring 57 is overcome, and the outlet valve 69/71 closes, while the inlet valve 69/70 opens.

The brake pressure fluid can now flow from brake valve 2 through a conduit 77 through the improperly open main valve 19, and through the open main valve 18 to the brake actuating cylinder 3 so that further braking of the car is assured.

It is advantageous that in accordance with the invention, also the operation of the safety control valve 65 is checked. For this purpose, the control piston 68 carries a rod 73 cooperating with a limit switch 74 which causes indication of the piston movement at the electronic control means 3' so that it can be determined whether the safety control valve 65 operates properly. The piston 21 of the main valve 19 also carries a rod 75 cooperating with an end switch 76, which is connected with the electronic control means 3' for indicating whether the main valve 19 properly operates. In this manner, it is possible to check the safety braking system before start of a drive, or at every inspection, to determine whether the safety control valve 65 and the main valve 19 operate properly.

A further advantage of the arrangement of FIG. 2 resides in that the main valve and the safety control valve can be checked with a minimum of switches, only two switches being required.

Figure 3:
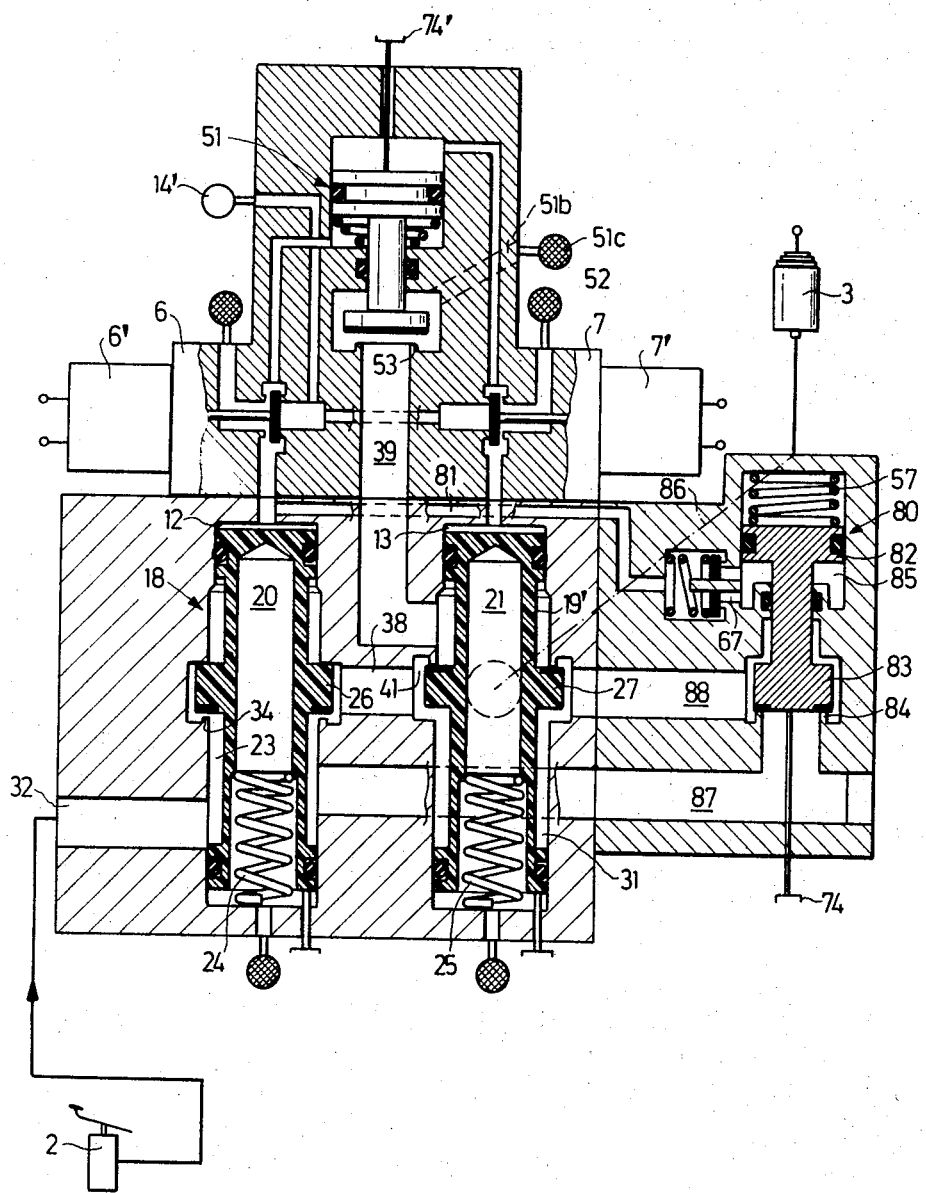
FIG. 3 is a schematic sectional view illustrating a third embodiment of the invention in which both main valves are associated with safety control valves.

In the embodiment of FIG. 3, the main valve 19' is modified, and has only one valve seat 41 cooperating with the valve portion 27. Two safety control valves are used, the safety control valve 51 corresponding to the safety control valve 51 described with reference to FIG. 1, and being associated with the discharge conduit 39 of the main valve 19'. The other safety control valve 80 assures the function of the main valve 18 with respect to the failure of one of the two electromagnetic control valves 6 or 7. In addition to the connecting conduits described with reference to FIG. 1, the cylinder chamber 12 of the main valve 18 is connected by a conduit 81 and a throttle check valve 67 with a cylinder chamber 85 under a control piston 82 of the safety control valve 80, which is biased in the opposite direction by spring 57. A valve portion 83 secured to piston 82 cooperates with a stationary valve seat 84 and forms therewith the inlet valve 83/84 which is held by a spring 57 in a normal closed position.

The safety control valves 51 and 80 operate as follows:

In the event that the main valve 19' does not operate properly due to a failure of the electromagnetic valve 7, valve member 52 closes valve seat 53 and thereby discharge conduit 39, as described with reference to FIG. 1, so that the braking operation takes place as described. If due to a failure of the electromagnetic valve 6, the main valve 18 sticks in the closed position, the throttle pressure rise of the fluid in chamber 85 has the effect that the inlet valve 83/84 opens so that the pressure fluid from brake valve 2 flows through valve 83/84, the annular space 81, and through a slanted channel 86, shown schematically in broken lines, to the brake cylinder 3 to obtain the braking effect. The control piston of each safety control valves 51 and 80 is mechanically coupled with a limit switch 74 and 74', respectively. Both switches 74 and 74' indicate the control piston movements at the electronic control means 3', and permitting control of the proper operation of the safety control valves 51 and 80. Evidently, the positions of the pistons 20 and 21' can be indicated in the same manner, as explained with reference to switch 76 in FIG. 2.

Figure 4:
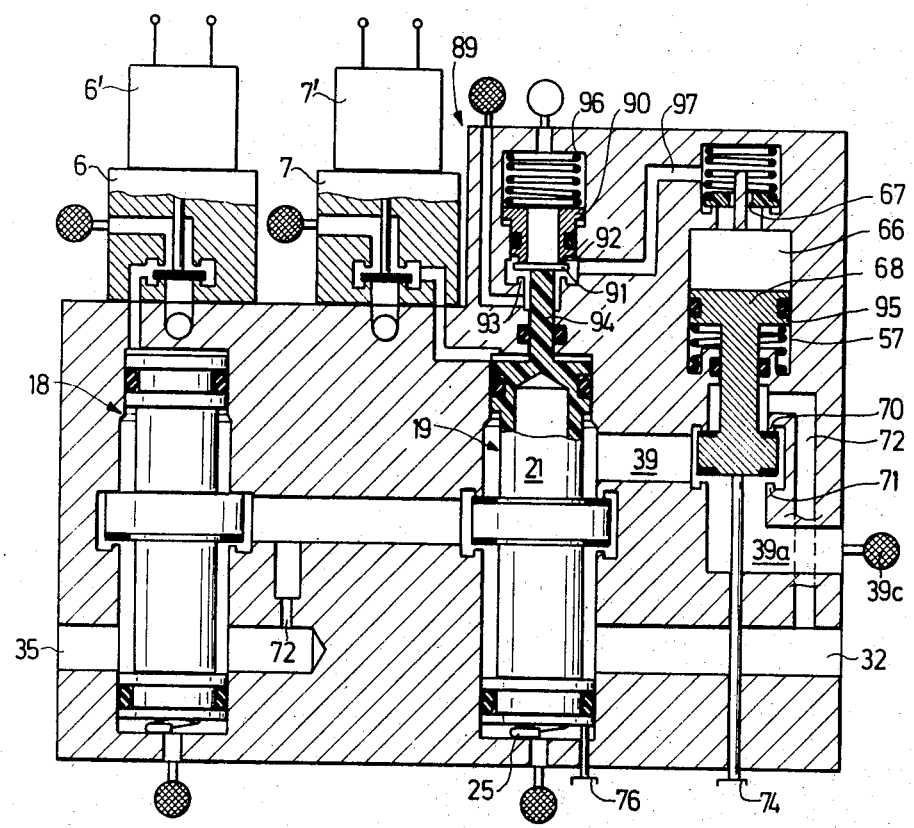
FIG. 4 is a schematic sectional view illustrating a fourth embodiment of the invention in which the piston of one of the main cylinders can operate the safety control valve.

FIG. 4 illustrates a further embodiment which is similar to the embodiment of FIG. 2. For obtaining a safe operation of the main valve 19 and of the electromagnetic valve 7, a control valve 89 is provided which is coupled through a connecting rod 94 with the main valve 19. The control valve 89, which includes a valve member 90 and two seats 92, 93 cooperating with valve member 91 secured to portion 94, responds through a conduit 97 to the pressure in the chamber 66 of a safety control valve 95. The piston 21 of main valve 19 operates control valve 89 mechanically through the piston portion 94. The closure member is biased by a spring 96 in axial direction, and is connected with the piston 21 of the main valve 19 by the action of two springs, namely the weaker spring 96 acting on the closure member 90, and the spring 25 of the main valve 19. Since the springs 25 and 96 act in opposite directions, the strokes are compensated. The safety control valve 95 is constructed in the same manner as the safety control valve 65 described with reference to FIG. 2.

Also in this embodiment, end switches 74 and 75 are advantageously provided, and as described with reference to FIG. 2, the end switch 74 is connected with the safety control valve piston, and the end switch 76 is mechanically connected with the piston 21 of the main valve 19.

If in the embodiment of FIG. 4, the main piston 21 of the main valve 19 remains in its initial position, perhaps due to sticking of the armature of the electromagnetic valve 7, or perhaps due to the fact that the piston 21 of the main valve 19 jams or laterally binds in its initial position of rest, in which the brake pressure cannot rise, the safety control valve 95 closes the discharge outlet, and opens the inlet for the pressure fluid, so that irrespective of the failure of a valve, the pressure in the brake actuating cylinder 3 can rise again.

Generally speaking, and referring mainly to FIG. 1, a safety brake system according to an embodiment of the invention, comprises brake actuating means 3 and brake operating means 2 therefor; two pressure operated main valves 18 and 19, one of the main valves 19 having a discharge conduit 39, said main valves 18, 19 having a first position connecting the brake operating means 2 with the brake actuating means 3 while the main valve 19 closes the discharge conduit 39 by the valve 27/37, and a second position in which the valve 27/37 opens the discharge conduit 39 for relieving the brake actuating means 3 while disconnecting the brake operating means 4 and the brake actuating means; two electromagnetic valves 6, 7 for moving the main valves 18, 19, respectively, between the first and second positions; and at least one safety control valve 51, 65, 80 biased to a normal position opening the discharge conduit 39 for relieving the brake actuating means 3 through the main valves 18, 19 and the discharge conduit 39 when the main valve 19 is placed in the second condition thereof by the electromagnetic valve 7; at least one electromagnetic valve 7 controlling the supply of pressure fluid to the control valve means 51 for closing the same and thereby the discharge conduit 39 when main valve 19 fails to close the discharge conduit 39.

It will be understood that each of the elements described above, or two or more together, may also find a useful application in other types of safety brake systems differing from the types described above.

While the invention has been illustrated and described as embodied in a safety brake system with a safety control valve closing a discharge conduit upon failure of a main valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Fluid operated safety brake system comprising brake actuating means and brake operating means therefor; two pressure operated main valves, one of said valves having a discharge conduit, said main valves having a first position connecting said brake operating means with said brake actuating means while said one main valve closes said discharge conduit, and a second position opening said discharge conduit for relieving said brake actuating means while disconnecting said brake operating means and said brake actuating means; two electromagnetic valves for moving said main valves, respectively, between said first and second positions; at least one safety control valve means including a control piston and spring biasing means biasing said control piston to a normal position opening said discharge conduit for relieving said brake actuating means through said main valves and said discharge conduit when said one main valve is placed in said second position by one of said electromagnetic valves; and pressure conduit means controlled by said electromagnetic valves so that pressure fluid is supplied to said control valve means for moving said piston against the action of said spring means to a position closing said discharge conduit when said one main valve fails to operate.

2. Brake system as claimed in claim 1 comprising sensing means for sensing a locked condition of a braked wheel, and generating a signal, and electronic control means receiving said signal and operating said electromagnetic valves in accordance with said signal so that said safety control valve is operated to close said discharge conduit when one of said electromagnetic valves fails to be operated by said electronic control means.

3. Brake system as claimed in claim 1 comprising a double valve having two valve seats and one valve member having two positions for cooperating with said seats, respectively, said valve member being mechanically connected with and operated by said one main valve between a discharge position, and an operative position for supplying pressure fluid to said control valve means for operating the same to move to said closed position.

4. Brake system as claimed in claim 3 wherein said double valve includes a piston having one of said valve seats, and a first spring biassing said piston and one seat toward said valve member; and wherein said one main valve includes a valve piston carrying said valve member, and a second spring biassing said valve piston to move with said valve member into abutment with said one valve seat.

5. Brake system as claimed in claim 1 comprising means operated by said control valve means for indicating the positions of said control valve means.

6. Brake system as claimed in claim 1 comprising at least one first limit switch operated by said control valve means; and at least one second limit switch operated by at least said one of said main valves for electrically indicating the positions of said control valve means and of said one main valve.

7. Brake system as claimed in claim 1 wherein said control valve means has a cylinder chamber for said control piston; and at least one control conduit connecting said electromagnetic valve means with said cylinder chamber.

8. Brake system as claimed in claim 7 wherein said control conduit includes a throttle valve operative during filling of said cylinder chamber, and inactive during emptying of said cylinder chamber.

9. Brake system as claimed in claim 8 wherein said throttle valve is a check valve.

* * * * *